US012739879B2

(12) United States Patent
Lin

(10) Patent No.: US 12,739,879 B2
(45) Date of Patent: Sep. 15, 2026

(54) APPARATUS AND METHOD OF WIRELESS COMMUNICATION

(71) Applicant: GUANGDONG OPPO MOBILE TELECOMMUNICATIONS CORP., LTD., Dongguan City (CN)

(72) Inventor: Hao Lin, Neuilly-sur-Seine (FR)

(73) Assignee: GUANGDONG OPPO MOBILE TELECOMMUNICATIONS CORP., LTD., Dongguan City (CN)

( * ) Notice: Subject to any disclaimer, the term of this patent is extended or adjusted under 35 U.S.C. 154(b) by 446 days.

(21) Appl. No.: 18/145,950

(22) Filed: Dec. 23, 2022

(65) Prior Publication Data

US 2023/0135241 A1 May 4, 2023

Related U.S. Application Data

(63) Continuation of application No. PCT/IB2021/059602, filed on Oct. 19, 2021.

(30) Foreign Application Priority Data

Oct. 23, 2020 (WO) .................. PCT/IB2020/000922

(51) Int. Cl.
*H04W 4/00* (2018.01)
*H04W 74/0808* (2024.01)
(Continued)

(52) U.S. Cl.
CPC ....... *H04W 74/0808* (2013.01); *H04L 1/1887* (2013.01); *H04W 72/12* (2013.01)

(58) Field of Classification Search
None
See application file for complete search history.

(56) References Cited

U.S. PATENT DOCUMENTS 12,389,452 B2 * 8/2025 Lei .................... H04W 72/1268
2020/0053798 A1 * 2/2020 Tsai ...................... H04W 72/23
(Continued)

FOREIGN PATENT DOCUMENTS

WO 2022079700 A1 4/2022

OTHER PUBLICATIONS

Xiaomi: "Enhancement for unlicensed band URLLC/IIoT" 3GPP Draft; R1-2005736, 3RD Generation Partnership Project (3GPP), Mobile Competence Centre; 650, Route Des Lucioles. F-06921 Sophia-Antipolis Cedex•France, vol. RAN WG1, No. e-Meeting: Aug. 17, 2020-Aug. 28, 2020 Aug. 7, 2020 (Aug. 7, 2020)—3 pages.

(Continued)

*Primary Examiner* — Bob A Phunkulh
(74) *Attorney, Agent, or Firm* — ASHURST PERKINS COIE US LLP

(57) ABSTRACT

An apparatus and a method of wireless communication are provided. The method by a user equipment (UE) includes determining a channel occupancy (CO) according to a first information and transmitting, to a base station (B S), an uplink (UL) transmission in the CO. This can solve issues in the prior art, reduce a signaling overhead, reduce a transmission latency, provide an uplink synchronization for uplink transmission, avoid the base station and the UE misunderstanding, provide a good communication performance, and/or provide high reliability.

10 Claims, 3 Drawing Sheets

(51) Int. Cl.

| | |
|---|---|
| *H04L 1/1867* | (2023.01) |
| *H04W 72/12* | (2023.01) |

(56) References Cited

U.S. PATENT DOCUMENTS

| | | | | |
|---|---|---|---|---|
| 2020/0245353 | A1* | 7/2020 | Tsai | H04W 72/23 |
| 2020/0275483 | A1* | 8/2020 | Li | H04W 16/14 |
| 2020/0280971 | A1* | 9/2020 | Moon | H04L 5/0053 |
| 2020/0305184 | A1* | 9/2020 | Kim | H04L 5/0053 |
| 2020/0351941 | A1* | 11/2020 | Aldana | H04W 74/006 |
| 2021/0092763 | A1* | 3/2021 | Li | H04W 72/569 |
| 2022/0210827 | A1* | 6/2022 | Wang | H04W 16/14 |
| 2022/0272754 | A1* | 8/2022 | Lei | H04W 74/0816 |
| 2022/0303781 | A1* | 9/2022 | Ye | H04W 16/14 |
| 2022/0304058 | A1* | 9/2022 | Wang | H04W 72/0446 |
| 2022/0304059 | A1* | 9/2022 | Lei | H04W 74/08 |
| 2022/0377790 | A1* | 11/2022 | Awadin | H04W 74/006 |
| 2022/0377813 | A1* | 11/2022 | Wang | H04W 74/0841 |
| 2022/0408461 | A1* | 12/2022 | Lei | H04W 74/0808 |
| 2023/0118130 | A1* | 4/2023 | Tao | H04W 74/006 370/329 |
| 2023/0156788 | A1* | 5/2023 | Lunttila | H04W 74/0808 370/329 |
| 2023/0199833 | A1* | 6/2023 | Xu | H04W 74/0808 370/329 |
| 2023/0239928 | A1* | 7/2023 | Oteri | H04W 74/0825 370/329 |
| 2023/0254893 | A1* | 8/2023 | Shibaike | H04B 7/0695 370/329 |
| 2023/0269772 | A1* | 8/2023 | Chen | H04W 74/0808 370/329 |
| 2023/0284261 | A1* | 9/2023 | Xu | H04W 74/006 370/328 |
| 2023/0328785 | A1* | 10/2023 | Zhang | H04L 5/0023 370/329 |
| 2023/0413320 | A1* | 12/2023 | Singh | H04W 74/0875 |
| 2024/0098781 | A1* | 3/2024 | Tsai | H04W 74/0808 |
| 2024/0237068 | A1* | 7/2024 | Guo | H04W 74/006 |

OTHER PUBLICATIONS

LG Electronics: "Discussion on unlicensed band URLLC/IIot" 3GPP Draft R1-2006316 3RD Generation Partnership Project (3GPP), Mobile Competence Centre; 650, Route Des Lucioles; F-06921 Sophia-Antipolis Cedex; France, vol. RAN WG1, No. e-Meeting; Aug. 17, 2020-Aug. 28, 2020 Aug. 7, 2020 (Aug. 7, 2020)—5 pages.

Oppo: "Enhancements for unlicensed band URLLC/IIoT" 3GPP Draft; R1-2006060, 3RD Generation Partnership Project (3GPP), Mobile Competence Centre; 650, Route Des Lucioles•F-06921 Sophia-Antipolis Cedex•France, vol. RAN WG1, No. e-Meeting; Aug. 17, 2020-Aug. 28, 2020 Aug. 7, 2020 (Aug. 7, 2020)—4 pages.

Ericsson: "Enhancements for IIoT/URLLC on Unlicensed Band" 3GPP Draft R1-2005515 3RD Generation Partnership Project (3GPP), Mobile Competence Centre; 650, Route Des Lucioles· F-06921 Sophia-Antipolis Cedex•France, vol. RAN WG1, No. e-Meeting; Aug. 17, 2020-Aug. 28, 2020 Aug. 8, 2020 (Aug. 8, 2020)—6 pages.

Spreadtrum Communications:"Discussion on enhancements for unlicensed band URLLCIIoT", 3GPP Draft; R1-2006277 3RD Generation Partnership Project (3GPP), Mobile Competence Centre; 650, Route Des Lucioles• F-06921 Sophia-Antipolis Cedex•France vol. RAN WG1, No. e-Meeting: Aug. 17, 2020-Aug. 28, 2020 Aug. 8, 2020 (Aug. 8, 2020)—4 pages.

Qualcomm Incorporated: "uplink enhancements for URLLC in unlicensed controlled environments", 3GPP Draft; R1-2006801, 3RD Generation Partnership Project (3GPP), Mobile Competence Centre; 650, Route Deslucioles; F-06921 Sophia-Antipolis Cedex; France, vol. RAN WG1, No. e-Meeting; Aug. 17, 2020-Aug. 28, 2020 Aug. 8, 2020 (Aug. 8, 2020)—7 pages.

Apple Inc: "URLLC uplink enhancements for unlicensed spectrum", 3GPP Draft; R1-2006516, 3RD Generation Partnership Project (3GPP), Mobile Competence Centre· 650 Route Des Lucioles F-06921 Sophiaantipolis Cedex; France, vol. RAN WG1, No. e-Meeting; Aug. 17, 2020-Aug. 28, 2020 Aug. 8, 2020 (Aug. 8, 2020)—5 pages.

Ericsson: "Views on WID objective for IIOT/URLLC operation over shared spectrum", 3GPP Draft; RP-200626, 3RD Generation Partnership Project (3GPP), Mobile Competence Centre•650 Route Des Lucioles• F-06921 Sophia-Antipolis Cedex; France, vol. TSG RAN, No. Online; Jun. 29, 2020-Jul. 3, 2020 Jun. 22, 2020 (Jun. 22, 2020)—6 pages.

Ericsson: "Channel access procedures", 3GPP Draft; R1-1912709, 3RD Generation Partnership Project (3GPP), Mobile Competence Centre; 650, Route Des Lucioles F-06921 Sophia-Antipolis Cedex• France vol. RAN WG1, No. Reno, USA; Nov. 18, 2019-Nov. 22, 2019 Nov. 9, 2019 (Nov. 9, 2019)—9 pages.

International Search Report in the international application No. PCT/IB2021/059602, mailed on Jan. 28, 2022—5 pages.

Written Opinion of the International Search Authority in the international application No. PCT/IB2021/059602, mailed on Jan. 28, 2022—10 pages.

3GPP TS 37.213 V16.3.0, "3rd Generation Partnership Project; Technical Specification Group Radio Access Network; Physical layer procedures for shared spectrum channel access (Release 16)", Technical Specification, (Sep. 2020)—26 pages.

First Office Action of the European application No. 21801999.0, issued on Nov. 6, 2025, 8 pages.

* cited by examiner

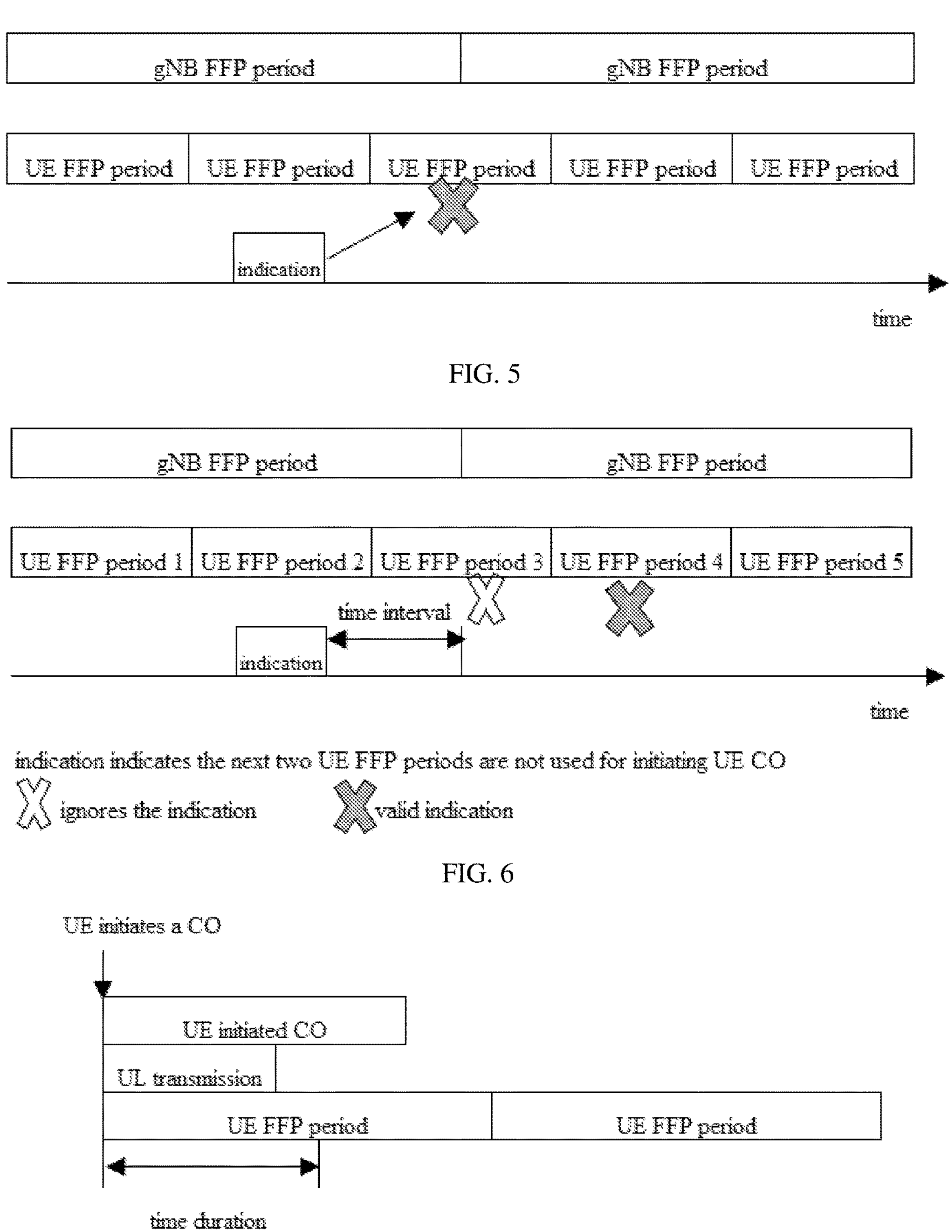
gNB FFP period
gNB FFP period
UE FFP period
UE FFP period
UE FFP period
UE FFP period
UE FFP period
indication
time
FIG. 5
gNB FFP period
gNB FFP period
UE FFP period 1
UE FFP period 2
UE FFP period 3
UE FFP period 4
UE FFP period 5
time interval
indication
time
indication indicates the next two UE FFP periods are not used for initiating UE CO
ignores the indication
valid indication
FIG. 6
UE initiates a CO
UE initiated CO
UL transmission
UE FFP period
UE FFP period
time duration
FIG. 7

APPARATUS AND METHOD OF WIRELESS COMMUNICATION

CROSS-REFERENCE TO RELATED APPLICATIONS

This is a continuation of International Application No. PCT/IB2021/059602 filed on Oct. 19, 2021, which claims priority to International Application No. PCT/IB2020/000922, filed on Oct. 23, 2020. The entire contents of the above referenced applications are incorporated herein by reference in their entireties.

BACKGROUND OF DISCLOSURE

1. Field of the Disclosure

The present disclosure relates to the field of communication systems, and more particularly, to an apparatus and a method of wireless communication, which can provide a good communication performance and/or high reliability.

2. Description of the Related Art

Communication over unlicensed spectrum: In an unlicensed band, an unlicensed spectrum is a shared spectrum. Communication equipment in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) or channel access procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT). LBT mechanism is also called a channel access procedure as described in TS 37.213. In new radio (NR) Release 16, there are different types of channel access procedures, e.g., type 1, type 2A, type 2B and type 2C channel access procedures as described in TS 37.213.

On an unlicensed carrier, for a channel occupation time obtained by a base station, it may share a channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability. LBT is also called channel access procedure. UE performs the channel access procedure before the transmission, if the channel access procedure is successful, i.e., the channel is sensed to be idle, the UE starts to perform the transmission. If the channel access procedure is not successful, i.e., the channel is sensed to be not idle, the UE cannot perform the transmission.

In the latest new radio unlicensed (NRU) system, if the NRU system is configured to be semi-static channel access mode, the UE cannot initiate a channel occupancy (CO), and the UE has to detect a downlink signal before being allowed to transmit any uplink transmission. This will greatly limit a UE performance, and notably increasing a transmission latency. To envision any latency stringent service, e.g., factory machine type communications or high-quality surveillance, the transmission latency needs to be reduced.

Therefore, there is a need for an apparatus and a method of wireless communication, which can solve issues in the prior art, reduce a signaling overhead, reduce a transmission latency, provide an uplink synchronization for uplink transmission, avoid the base station and the UE misunderstanding, provide a good communication performance, and/or provide high reliability.

SUMMARY

An object of the present disclosure is to propose an apparatus (such as a user equipment (UE) and/or a base station) and a method of wireless communication, which can solve issues in the prior art, reduce a signaling overhead, reduce a transmission latency, provide an uplink synchronization for uplink transmission, avoid the base station and the UE misunderstanding, provide a good communication performance, and/or provide high reliability.

In a first aspect of the present disclosure, a method of wireless communication by a user equipment (UE) comprises determining a channel occupancy (CO) according to a first information and transmitting, to a base station (BS), an uplink (UL) transmission in the CO.

In a second aspect of the present disclosure, a method of wireless communication by a base station comprises controlling a user equipment (UE) to determine a channel occupancy (CO) according to a first information and receiving, from the UE, an uplink (UL) transmission in the CO.

In a third aspect of the present disclosure, a user equipment (UE) comprises a memory, a transceiver, and a processor coupled to the memory and the transceiver. The processor is configured to determine a channel occupancy (CO) according to a first information, and the transceiver is configured to transmit, to a base station (BS), an uplink (UL) transmission in the CO.

In a fourth aspect of the present disclosure, a base station comprises a memory, a transceiver, and a processor coupled to the memory and the transceiver. The processor is configured to controls a user equipment (UE) to determine a channel occupancy (CO) according to a first information, and the transceiver is configured to receive, from the UE, an uplink (UL) transmission in the CO.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 5 illustrates an example of initiating a channel occupancy according to an embodiment of the present disclosure.

FIG. 6 illustrates an example of initiating a channel occupancy according to an embodiment of the present disclosure.

FIG. 7 illustrates an example of initiating a channel occupancy according to an embodiment of the present disclosure.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For uplink transmissions or downlink transmissions in a shared spectrum, a user equipment (UE) or a gNB may perform a channel access procedure before transmitting one or more uplink transmissions or one or more downlink transmissions in a channel. The channel access procedure comprises sensing a channel to determine whether the channel is idle or busy. Optionally, a channel access procedure may comprise at least a type 1 channel access according to section 4.2.1.1 of TS37.213, or a type 2A channel access according to section 4.2.1.2.1 of TS37.213, or a type 2B channel access according to section 4.2.1.2.2 of TS37.213, or a type 2C channel access according to section 4.2.1.2.3 of TS37.213.

Figures 1, 2, 3, 4:
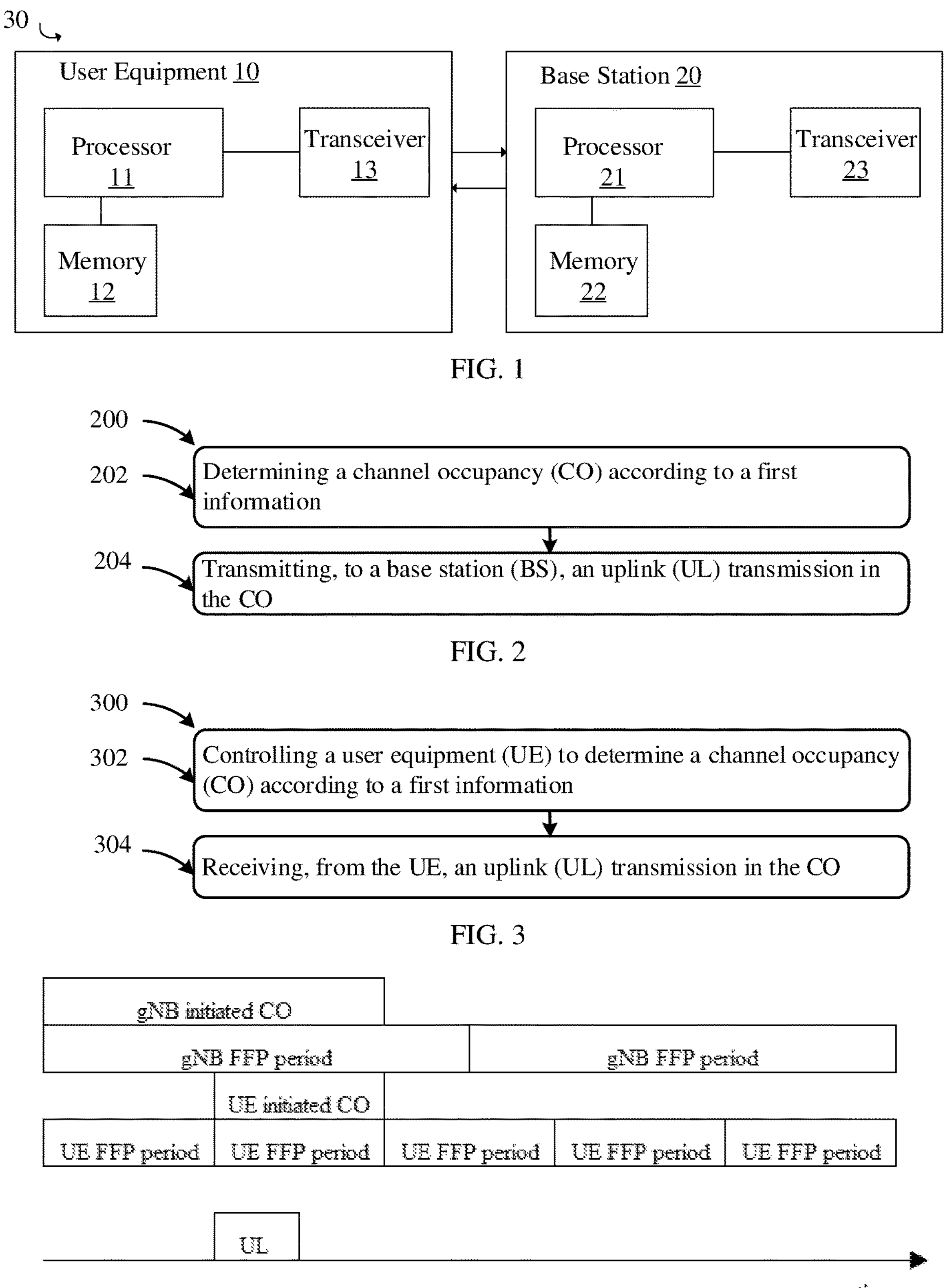
FIG. 1 is a block diagram of one or more user equipments (UEs) and a base station (e.g., gNB) of communication in a communication network system according to an embodiment of the present disclosure.
FIG. 2 is a flowchart illustrating a method of wireless communication performed by a user equipment (UE) according to an embodiment of the present disclosure.
FIG. 3 is a flowchart illustrating a method of wireless communication performed by a base station according to an embodiment of the present disclosure.
FIG. 4 illustrates an example of initiating a channel occupancy according to an embodiment of the present disclosure.

FIG. 1 illustrates that, in some embodiments, one or more user equipments (UEs) 10 and a base station (e.g., gNB) 20 for transmission adjustment in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to determine a channel occupancy (CO) according to a first information, and the transceiver 13 is configured to transmit, to the base station (BS) 20, an uplink (UL) transmission in the CO. This can solve issues in the prior art, reduce a signaling overhead, reduce a transmission latency, provide an uplink synchronization for uplink transmission, avoid the base station and the UE misunderstanding, provide a good communication performance, and/or provide high reliability.

In some embodiments, the processor 21 is configured to control the user equipment (UE) 10 to determine a channel occupancy (CO) according to a first information, and the transceiver 23 is configured to receive, from the UE 10, an uplink (UL) transmission in the CO. This can solve issues in the prior art, reduce a signaling overhead, reduce a transmission latency, provide an uplink synchronization for uplink transmission, avoid the base station and the UE misunderstanding, provide a good communication performance, and/or provide high reliability.

FIG. 2 illustrates a method 200 of wireless communication by a user equipment (UE) according to an embodiment of the present disclosure. In some embodiments, the method 200 includes: a block 202, determining a channel occupancy (CO) according to a first information, and a block 204, transmitting, to a base station (BS), an uplink (UL) transmission in the CO. This can solve issues in the prior art, reduce a signaling overhead, reduce a transmission latency, provide an uplink synchronization for uplink transmission, avoid the base station and the UE misunderstanding, provide a good communication performance, and/or provide high reliability.

FIG. 3 illustrates a method 300 of wireless communication by a base station according to an embodiment of the present disclosure. In some embodiments, the method 300 includes: a block 302, controlling a user equipment (UE) to determine a channel occupancy (CO) according to a first information, and a block 304, receiving, from the UE, an uplink (UL) transmission in the CO. This can solve issues in the prior art, reduce a signaling overhead, reduce a transmission latency, provide an uplink synchronization for uplink transmission, avoid the base station and the UE misunderstanding, provide a good communication performance, and/or provide high reliability.

In some embodiments, the first information comprises at least one of the followings: an indication, a pre-defined rule, or a condition. In some embodiments, the CO comprises at least one of the followings: a UE initiated CO or a BS initiated CO. In some embodiments, the condition comprises an ordering, and the UE selects the UE initiated CO or the BS initiated CO according to the ordering. In some embodiments, the ordering comprises that the BS initiated CO has a higher priority than the UE initiated CO. In some embodiments, the UE obtains information about that the BS initiated CO is allowed for the UE to transmit the UL transmission. In some embodiments, the UE obtains information about if a BS CO is initiated and when the BS CO is initiated, such that the UE can transmit the UL transmission in the BS initiated CO. In some embodiments, the ordering comprises that the UE initiated CO has a higher priority than the BS initiated CO. In some embodiments, the ordering comprises that when the UE cannot transmit the UL transmission in the BS initiated CO, the UE selects the UE initiated CO for the UL transmission. In some embodiments, the ordering comprises that when the UE cannot transmit the UL transmission in the UE initiated CO, the UE selects the BS initiated CO for the UL transmission.

In some embodiments, the ordering comprises that the UE is allowed to transmit the UL transmission in the BS initiated CO, if the UL transmission is confined in the BS initiated CO in time domain and/or confined in the BS initiated CO in frequency domain. In some embodiments, the UL transmission confined in the BS initiated CO means that the UL transmission comprises a set of symbols in the time domain and the set of symbols are within the BS initiated CO, where the BS initiated CO starts from a beginning of a BS fixed frame period (FFP) period and ends at a maximum CO, where the maximum CO is determined according to a standard specification. In some embodiments, the UL transmission confined in the BS initiated CO in the frequency domain means that the UL transmission comprises a set of frequency domain resources and the set of frequency domain resources is in one or more resource block (RB) sets of the BS initiated CO. In some embodiments, the ordering is pre-defined, or the ordering is configured by the BS. In some embodiments, the indication comprises that the UE is indicated to transmit, to the BS, the UL transmission in the UE initiated CO or the BS initiated CO. In some embodiments, the indication comprises that the UE is indicated by the BS to avoid initiating a UE CO in one or more UE FFP periods.

In some embodiments, the indication is used to indicate the one or more UE FFP periods are not for the UE to initiate the UE CO. In some embodiments, the one or more UE FFP periods comprises next consecutive one or more UE FFP periods after a UE FFP period in which the indication is received. In some embodiments, the indication is transmitted in a medium access control-control element (MAC-CE), a downlink control information (DCI), and/or a system information. In some embodiments, the indication is carried in a DCI format and the DCI format is transmitted in a physical downlink control channel (PDCCH). In some embodiments, when the UE receives the indication from the BS, the UE determines if the indication is valid. In some embodiments, there is a time interval starts from an end of the PDCCH and a duration of the time interval is known by the UE. In some embodiments, the UE determines a validation of an indication check if a starting location of the one or more UE FFP periods are within the time interval. In some embodiments, if the starting location of the one or more UE FFP periods are within the time interval, the UE ignores the indication, such that the UE initiates the UE CO in the one or more UE FFP periods. In some embodiments, if the starting location of the one or more UE FFP periods are outside the time interval, the UE follows the indication, such that the UE does not initiate the UE CO in the one or more UE FFP periods.

In some embodiments, the indication is associated with one or more serving cells corresponding to one or more serving cell identifier (ID). In some embodiments, the DCI format comprises a DCI format 2_0. In some embodiments, the DCI format 2_0 comprises an indication field and the indication field is used for the indication. In some embodiments, the indication field is located from a bit location and comprises a bitwidth. In some embodiments, the bit location is signaled to the UE and the bitwidth is derived from a number of rows of a table. In some embodiments, the table is configured by the BS. In some embodiments, the table comprises a set of rows, and each row comprises an indication for one or more UE FFP periods. In some embodiments, the time interval is configured and/or pre-defined. In some embodiments, the time interval is relevant to a UE processing time. In some embodiments, the UE processing time comprises a time duration for processing the PDCCH carrying the indication. In some embodiments, the UE processing time is determined according to a standard specification.

In some embodiments, for a UE FFP period, when the UE is configured to monitor the DCI format carrying the indication, but the UE does not receive the indication corresponding to the UE FFP period, the UE performs a pre-defined behavior. In some embodiments, the pre-defined behavior is that the UE is allowed to initiate a UE CO in the UE FFP period. In some embodiments, the pre-defined behavior is that the UE is not allowed to initiate a UE CO in the UE FFP period. In some embodiments, the system information comprises a system information block (SIB). In some embodiments, the SIB comprises an SIBx, where x is an integer starting from 1. In some embodiments, the indication comprises a parameter used to indicate whether the UE can transmit the UL transmission in the UE initiated CO. In some embodiments, in a UE FFP period, the UE is configured, by the BS, with a first UL resource and a second UL resource, and the first UL resource is configured with a first configured grant configuration and the second UL resource is configured with a second configured grant configuration.

In some embodiments, the first configured grant configuration and/or the second configured grant configuration comprises the parameter, and the parameter is used to indicate whether the UE can transmit a corresponding UL resource in the UE initiated CO. In some embodiments, the first UL resource is configured to be transmitted in the BS initiated CO and the second UL resource is configured to be transmitted in the UE initiated CO. In some embodiments, the first configured grant configuration and/or the second configured grant configuration is pre-defined. In some embodiments, the condition comprises that the UE selects if the UL transmission is transmitted in the UE initiated CO or the BS initiated CO. In some embodiments, when the UE selects the UL transmission transmitted in the UE initiated CO or the BS initiated CO, the UE informs, to the BS, a first information. In some embodiments, the first information is carried in the UL transmission. In some embodiments, the first information comprises a configured grant uplink control information (CG-UCI). In some embodiments, the first information comprises an indication field used to indicate a first value or a second value, where the first value is related to the UL transmission in the BS initiated CO, and the second value is related to the UL transmission in the UE initiated CO. In some embodiments, the first value is relevant to that a UE CO is not shared. In some embodiments, the second value is relevant to that the UE CO is shared.

In some embodiments, the indication field is relevant to a CO sharing information. In some embodiments, for the UL transmission in an UL resource, when the UL transmission comprises the CG-UCI and the UE is provided by the BS with an energy detection threshold, the UE performs a channel access procedure for the UL transmission. In some embodiments, when the UE performs the channel access procedure to initiate a UE CO in a UE FFP period for the UL transmission, the UE sets a maximum energy detection threshold $X_{Thresh\_max}$ to a value provided by the energy detection threshold. In some embodiments, when the UE performs the channel access procedure to initiate the UE CO in the UE FFP period for the UL transmission and when the UE shares the UE CO with another device, the UE sets the maximum energy detection threshold $X_{Thresh\_max}$ to the value provided by the energy detection threshold. In some embodiments, when the UE performs the channel access procedure for transmitting the UL transmission in the UE initiated CO and when the UE shares the UE CO with the another device, the UE sets the maximum energy detection threshold $X_{Thresh\_max}$ as to the value provided by the energy detection threshold.

In some embodiments, the another device comprises at least the base station, another base station, and/or another UE. In some embodiments, when the UE performs a channel access procedure for transmitting the UL transmission in the BS initiated CO, the UE sets a maximum energy detection threshold $X_{Thresh\_max}$ to a different value from the energy detection threshold. In some embodiments, the energy detection threshold comprises a sharing energy detection threshold. In some embodiments, a value of the energy detection threshold is provided by a parameter, ul-toDL-COT-SharingED-Threshold. In some embodiments, the maximum energy detection threshold $X_{Thresh\_max}$ is pre-defined. In some embodiments, the condition comprises that when the UE initiates a UE CO in a UE FFP period and the UE is configured, by the BS, with a time duration starting from a beginning of the UE FFP period, the UE performs the UL transmission within the time duration. In some embodiments, the UE CO can be shared starting from the time duration.

An FBE mode is also known as performing a channel access procedure for semi-static channel occupancy according to section 4.3 of TS 37.213. A device can initiate a channel occupancy at the beginning of every period. In this disclosure, some embodiments assume a system is configured with the FBE mode. For a communication between two devices, one device may be an initiating device and the other device may be a responding device. The initiating device and/or the responding device may comprise at least one of the followings: a base station or a user equipment (UE). In the following examples, it is assumed a communication between a base station and a UE, where the base station comprises gNB and/or eNB.

FIG. 4 illustrates an example of initiating a channel occupancy according to an embodiment of the present disclosure. FIG. 4 illustrates that, in some embodiments, a base station may configure a period for which the base station can initiate a channel occupancy at the beginning of the period and this period is called as a FFP period and the period for the base station is called call as a gNB FFP period. Similarly, a UE may be configured another period for the UE to initiate the channel occupancy, and this period is called as a UE FFP period. FIG. 4, illustrates an example of a gNB FFP period and a UE FFP period. When a gNB initiates a channel occupancy (CO) in the gNB FFP period, the gNB may transmit downlink transmissions in the CO. Moreover, the gNB can share its CO with a UE, so that the UE can perform UL transmissions in the gNB CO. In some embodiments of this disclosure, when a gNB initiates a CO, the CO is called as a gNB initiated CO. Similarly, the UE may initiate a CO in its FFP period, and the UE may transmit uplink transmissions in the CO, or the UE may share its CO with the gNB. In some embodiments of this disclosure, when the UE initiates a CO, the CO is called as a UE initiated CO.

In some examples, a UE intends to perform an UL transmission in an UL resource as illustrated in FIG. 4, the UL resource is in a gNB FFP period and in a UE FFP period. The UE may need to determine whether the UL transmission is transmitted in UE initiated COT or in gNB initiated COT. This determination needs to be clear to the UE and the gNB, so that the UE and the gNB do not have misunderstanding. Thus, in the following, different methods are provided for the UE and/or the gNB to determine that the UE can transmit the uplink transmission in which CO, i.e., in the UE initiated CO or the gNB initiated CO.

Option 1

In the option 1, when a UE intends to perform an UL transmission is an UL resource, and when the UL transmission may be transmitted in either the gNB initiated CO or the UE initiated CO, the UE can select a CO based on a given ordering. For instance, the given ordering comprises that gNB initiated CO has higher priority than UE initiated CO, i.e., the UE prioritizes the gNB initiated CO first over the UE initiated CO. It is to note that the given ordering may be pre-defined, e.g., specified in the standard, or the given ordering may be configured by the network. In this example, it is assumed that the UE obtains an information about the gNB initiated CO being allowed for the UE to transmit UL transmission. Optionally, the UE obtains an information about if the gNB CO is initiated and when the gNB CO is initiated, it implies that the UE can transmit the UL in the gNB initiated CO.

Optionally, when the UE cannot transmit UL transmission in the gNB initiated CO, e.g., the gNB CO is not initiated or the gNB initiated CO is not allowed for the UE to share, the UE can select the UE initiated CO for the UL transmission. Optionally, the given ordering may be to prioritize the UE initiated CO, if the UE has initiated CO or if the UE can start to initiate a CO for the UL transmission. Optionally, the UE is allowed to transmit the UL in the gNB initiated CO, if the UL transmission is confined in the gNB initiated CO in time domain and/or confined in the gNB initiated CO in frequency domain. The UL transmission confined in the gNB initiated CO means that the UL transmission comprises a set of symbols in time domain and the set of symbols are within the gNB initiated CO, where the gNB initiated CO starts from the beginning of the gNB FFP period and ends at a maximum CO, where the maximum CO may be determined according to TS 37.213. The UL transmission confined in the gNB initiated CO in frequency domain means that the UL transmission comprises a set of frequency domain resources and the set of frequency domain resource are in one or more resource block (RB) sets of the gNB initiated CO. The advantage of the option 1 is that it is very simple and the UE and the gNB can have a same understanding. But the drawback is that it is not flexible.

Option 2

In the option 2, the network may indicate the UE to avoid initiating a UE CO in one or more UE FFP period. The advantage of this option is that the network can flexibly control the UE initiation CO. For instance, the indication may be transmitted in a MAC-CE and/or a DCI. In FIG. 5, the UE receives an indication, where the indication may be transmitted in a MAC-CE or a DCI. The indication may be used to indicate that one or more UE FFP periods are not for the UE to initiate UE CO. The one or more UE FFP periods may be the next consecutive one or more FFP periods after the UE FFP period in which the indication is received. For an example as illustrated in FIG. 5, the UE receives an indication in a UE FFP period and the indication indicates that the next one UE FFP period is not used for the UE to initiate the UE CO.

In some examples, when receiving the indication from the network, the UE determines if the indication is valid. For instance, the UE receives an indication in UE FFP period 2 and the indication indicates that the next UE FFP periods, i.e., period 3 and period 4 in FIG. 6, are not used for initiating the UE CO. In this example, it is assumed the indication is carried in a DCI format and the DCI format is transmitted in a PDCCH. Then, some examples introduce a time interval, where the time interval starts from the end of the PDCCH, and the duration of the time interval is known by the UE. Thus, the UE may determine the validation of the indication check if the starting location of the period 3 and period 4 is within the time interval. In FIG. 6, the starting location of the UE FFP period 3 is inside the time interval, then the UE may ignore the indication, i.e., the UE may still initiate the UE CO at the beginning of the UE FFP period 3. For UE FFP period 4, as its starting location is outside the time interval, the UE may follow the indication and the UE does not initiate UE COT in the UE FFP period 4. Optionally, the indication may be associated with one or more serving cells corresponding to one or more serving cell ID.

Optionally, the DCI format comprises DCI format 2_0. Optionally, the DCI format 2_0 comprises an indication field, and the field is used to for the indication. Optionally, the indication field is located from a bit location and comprises a bitwidth, where the bit location is signaled to the UE, and the bitwidth is derived from a number of rows of a table. The table is configured by the network, and the table comprises a set of rows, each row comprises an indication for one or more UE FFP periods. Optionally, the time interval may be configured and/or pre-defined. Optionally, the time interval is relevant to UE processing time. Optionally, the processing time may be a time duration for processing the PDCCH carrying the indication. Optionally the UE processing time may be determined according to TS 38.213. In some examples, for a UE FFP period, when the UE is configured to monitor a DCI format carrying the indication, but the UE does not receive the indication corresponding to the UE FFP period, the UE may perform a pre-defined behavior, wherein the pre-defined behavior is that the UE is allowed to initiate a UE CO in the UE FFP period. Optionally, the pre-defined behavior is that the UE is not allowed to initiate a UE CO in the UE FFP period. In some examples, the network can transmit this indication in a system information, e.g., system information block (SIB), which includes SIBx, where x is an integer starting from 1.

Option 3

In some examples, in a UE FFP period, the network may configure a first UL resource and a second UL resource, wherein the first UL resource is configured with a first configured grant configuration, and the second UL resource is configured with a second configured grant configuration. The net configured grant configuration, e.g., according to ConfiguredGrantConfig according to TS 38.331, may comprise a parameter, wherein the parameter is used to indicate whether the UE can transmit the corresponding UL resource in UE initiated CO. For instance, the first UL resource may be configured to be transmitted in gNB initiated CO, and the second UL resource may be configured to be transmitted in the UE initiated CO. The advantage is that the network can use different configurations to control the UE initiated CO, so that less overhead is needed for further indicating a UE CO in a UE FFP period can be initiated by a UE.

Option 4

In some examples, the UE may select if an UL transmission is transmitted in the UE initiated CO or in the gNB initiated CO. Then, the UE can inform the gNB with a first information. Optionally, the first information is carried in the UL transmission. Optionally, the first information comprises a configured grant uplink control information (CG-UCI). Optionally, the first information comprises an indication field, and the indication field may indicate a first value or a second value, wherein the first value is related to the UL transmission is in the gNB initiated CO, and the second value is related to the UL transmission is in the UE initiated CO. Optionally, the first value is relevant to that the UE CO is not shared. Optionally, the second value is relevant to that the UE CO is shared. Optionally, the indication field is relevant to a CO sharing information.

In some examples, for an UL transmission in an UL resource, when the UL transmission comprises a CG-UCI, and the UE is provided by the gNB with an energy detection threshold, the UE may perform the following: When the UE performs channel access procedures to initiate a UE CO in a UE FFP period for the UL transmission, the UE sets a maximum energy detection threshold $X_{Thresh\_max}$ as described in TS 37.213 to the value provided by the energy detection threshold. Optionally. When the UE performs channel access procedures to initiate a UE CO in a UE FFP period for the UL transmission and when the UE shares the UE CO with another device, the UE sets a maximum energy detection threshold $X_{Thresh\_max}$ as described in TS 37.213 to the value provided by the energy detection threshold. Optionally, when the UE performs channel access procedures for transmitting the UL transmission in the UE initiated CO and when the UE shares the UE CO with another device, the UE sets a maximum energy detection threshold $X_{Thresh\_max}$ as described in TS 37.213 to the value provided by the energy detection threshold.

In the above examples, the another device comprises at least a gNB and/or another UE. Optionally, when the UE performs channel access procedures for transmitting the UL transmission in a gNB initiated CO, the UE may set maximum energy detection threshold $X_{Thresh\_max}$ to a different value from the energy detection threshold. Optionally, the energy detection threshold comprises a sharing energy detection threshold. Optionally, the value of the energy detection threshold is provided by a parameter ul-toDL-COT-SharingED-Threshold. The advantage of the option 4 is that it is the most flexible method such that the UE can select in which CO the UE performs UL transmission according to the needs.

Option 5

In some examples, when a UE initiates a UE CO in a UE FFP period, the network may configure a time duration and the time duration starts from the beginning of the UE FFP period, the UE can perform the UL transmission within the time duration as shown in FIG. 7. The gNB may assume that the UE CO can be shared starting from the time duration.

It is to note that some of the examples presented previously may not be mutual exclusive and may be combined together. Thus, we do not give further examples for such combinations.

Commercial interests for some embodiments are as follows. 1. Solving issues in the prior art. 2. Reducing a signaling overhead. 3. Reducing a transmission latency. 4. Providing an uplink synchronization for uplink transmission. 5. Avoiding the base station and the UE misunderstanding. 6. Providing a good communication performance. 7. Providing a high reliability. 8. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 8:
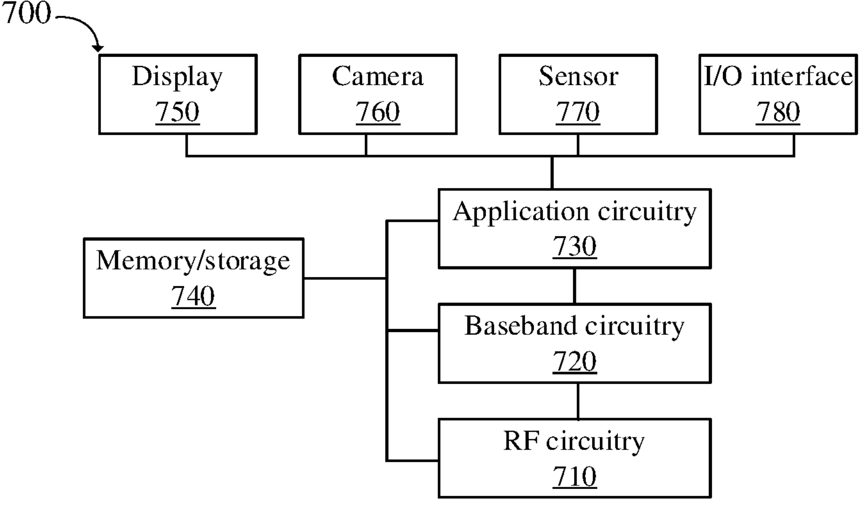
FIG. 8 is a block diagram of a system for wireless communication according to an embodiment of the present disclosure.

FIG. 8 is a block diagram of an example system 700 for wireless communication according to an embodiment of the present disclosure. Embodiments described herein may be implemented into the system using any suitably configured hardware and/or software. FIG. 8 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:

determining a channel occupancy (CO) according to a first information, wherein the first information comprises a condition, and the CO comprises at least one of a UE initiated CO or a BS initiated CO, wherein the condition comprises an ordering, and the UE selects the UE initiated CO or the BS initiated CO according to the ordering; and transmitting, to a base station (BS), an uplink (UL) transmission in the CO, wherein the ordering comprises that the BS initiated CO has a higher priority than the UE initiated CO, and wherein the UE obtains information about if a BS CO is initiated and when the BS CO is initiated, such that the UE can transmit the UL transmission in the BS initiated CO, wherein the ordering comprises that the UE is allowed to transmit the UL transmission in the BS initiated CO, if the UL transmission is confined in the BS initiated CO in time domain and/or confined in the BS initiated CO in frequency domain, wherein the UL transmission confined in the BS initiated CO in the time domain means that the UL transmission comprises a set of symbols in the time domain and the set of symbols are within the BS initiated CO, where the BS initiated CO starts from a beginning of a BS fixed frame period (FFP) period and ends at a maximum CO, where the maximum CO is determined according to a standard specification, and the UL transmission confined in the BS initiated CO in the frequency domain means that the UL transmission comprises a set of frequency domain resources and the set of frequency domain resources is in one or more resource block (RB) sets of the BS initiated CO.

2. The method of claim 1, wherein the first information further comprises at least one of an indication, a pre-defined rule.

3. The method of claim 2, wherein the indication comprises that the UE is indicated to transmit, to the BS, the UL transmission in the UE initiated CO or the BS initiated CO.

4. The method of claim 3, wherein the indication is transmitted in a medium access control-control element (MAC-CE), a downlink control information (DCI), and/or a system information.

5. The method of claim 3, wherein when the UE receives the indication from the BS, the UE determines if the indication is valid.

6. A wireless communication method by a base station (BS), comprising:

controlling a user equipment (UE) to determine a channel occupancy (CO) according to a first information, wherein the first information comprises a condition, and the CO comprises at least one of a UE initiated CO or a BS initiated CO, wherein the condition comprises an ordering, and the BS controls the UE to select the UE initiated CO or the BS initiated CO according to the ordering; and receiving, from the UE, an uplink (UL) transmission in the CO, wherein the ordering comprises that the BS initiated CO has a higher priority than the UE initiated CO, and wherein the BS controls the UE to obtain information about if a BS CO is initiated and when the BS CO is initiated, such that the BS controls the UE to transmit the UL transmission in the BS initiated CO, wherein the ordering comprises that the UE is allowed to transmit the UL transmission in the BS initiated CO, if the UL transmission is confined in the BS initiated CO in time domain and/or confined in the BS initiated CO in frequency domain, wherein the UL transmission confined in the BS initiated CO in the time domain means that the UL transmission comprises a set of symbols in the time domain and the set of symbols are within the BS initiated CO, where the BS initiated CO starts from a beginning of a BS fixed frame period (FFP) period and ends at a maximum CO, where the maximum CO is determined according to a standard specification, and wherein the UL transmission confined in the BS initiated CO in the frequency domain means that the UL transmission comprises a set of frequency domain resources and the set of frequency domain resources is in one or more resource block (RB) sets of the BS initiated CO.

7. The method of claim 6, wherein the first information further comprises at least one of an indication, a pre-defined rule.

8. A base station, comprising:

a memory;

a transceiver; and a processor coupled to the memory and the transceiver;

wherein the processor is configured to cooperate with the transceiver to implement the method of claim 6.

9. A user equipment (UE), comprising:

a memory;

a transceiver; and a processor coupled to the memory and the transceiver;

wherein the processor is configured to cooperate with the transceiver to:

determine a channel occupancy (CO) according to a first information, wherein the first information comprises a condition, and the CO comprises at least one of a UE initiated CO or a BS initiated CO, wherein the condition comprises an ordering, and the UE selects the UE initiated CO or the BS initiated CO according to the ordering; and transmit, to a base station (BS), an uplink (UL) transmission in the CO, wherein the ordering comprises that the BS initiated CO has a higher priority than the UE initiated CO, and wherein the UE obtains information about if a BS CO is initiated and when the BS CO is initiated, such that the UE can transmit the UL transmission in the BS initiated CO, wherein the ordering comprises that the UE is allowed to transmit the UL transmission in the BS initiated CO, if the UL transmission is confined in the BS initiated CO in time domain and/or confined in the BS initiated CO in frequency domain, wherein the UL transmission confined in the BS initiated CO in the time domain means that the UL transmission comprises a set of symbols in the time domain and the set of symbols are within the BS initiated CO, where the BS initiated CO starts from a beginning of a BS fixed frame period (FFP) period and ends at a maximum CO, where the maximum CO is determined according to a standard specification, and wherein the UL transmission confined in the BS initiated CO in the frequency domain means that the UL transmission comprises a set of frequency domain resources and the set of frequency domain resources is in one or more resource block (RB) sets of the BS initiated CO.

10. The UE of claim 9, wherein the first information further comprises at least one of an indication, a pre-defined rule.

* * * * *